United States Patent [19]

Steinau

[11] 4,181,767

[45] Jan. 1, 1980

[54] PLASTER BOARD PANELS

[75] Inventor: Peter Steinau, Mainz, Fed. Rep. of Germany

[73] Assignee: Hoechst Aktiengesellschaft, Frankfurt am Main, Fed. Rep. of Germany

[21] Appl. No.: 898,414

[22] Filed: Apr. 20, 1978

[30] Foreign Application Priority Data

Apr. 25, 1977 [DE] Fed. Rep. of Germany ....... 2718322

[51] Int. Cl.$^2$ ...................... B32B 23/02; B32B 23/06; B32B 27/02; B32B 9/06
[52] U.S. Cl. .................................. 428/219; 428/296; 428/535; 428/537; 428/538; 156/45; 156/39; 52/309.15; 428/513
[58] Field of Search ...................... 428/68, 70, 71, 76, 428/507, 537, 538, 296, 511, 513, 219; 156/39–41, 43, 44, 45; 52/309.15, 417

[56] References Cited

U.S. PATENT DOCUMENTS

| 2,526,125 | 10/1950 | Francis | 428/296 X |
|---|---|---|---|
| 3,278,365 | 10/1966 | Adams | 428/538 X |
| 3,350,257 | 10/1967 | Hourigan et al. | 52/309.15 X |
| 3,616,160 | 10/1971 | Wincklhofer et al. | 428/296 |
| 3,639,195 | 2/1972 | Sanders | 428/296 |
| 3,806,389 | 4/1974 | Gwynne | 428/70 X |
| 4,057,662 | 11/1977 | Johnson et al. | 428/538 X |

*Primary Examiner*—George F. Lesmes
*Assistant Examiner*—Alexander S. Thomas
*Attorney, Agent, or Firm*—Curtis, Morris & Safford

[57] ABSTRACT

Plaster board panels wherein at least the top layer of one of the two cardboard sheets contains polyolefin fibrides can be easily dehydrated during their manufacture because of the porosity of the cardboard sheets. The finished panels have a substantially sealed surface of low porosity which is resistant to wet treatment and thus suitable for the application of various painting and coating systems.

23 Claims, No Drawings

PLASTER BOARD PANELS

Plaster boards are generally manufactured as follows:

An aqueus gypsum paste is fed batchwise or continuously into the interspace between two sheets of cardboard containing of cellulose, and panels are thus formed. In order to set of the gypsum and remove excess water, the panels are subjected to a heat treatment at a temperature of about 250° C. The cardboard material forming the surfaces of the panels must be absorbent and of high porosity in order to ensure evaporation of the water through the cardboard material during the heat treatment. Plaster board panels are ordinarily used for internal construction work, that is, as wall and ceiling elements. To protect and decorate the surface, it is covered for example with paint, lacquer or wallpaper.

However, the high absorptivity and porosity of the cardboard required for the manufacture of plaster boards is very disadvantageous to the subsequent surface treatment. Liquid paints are absorbed very rapidly and to a large extent, thus hindering the formation of a uniform and coherent paint film, and causing an excessive consumption of paint. The poor wet resistance of the cardboard surface causes difficulties during the removal of wallpaper, which is generally removed by soaking it with water and subsequently tearing it off. Ordinarily, the surface of the plaster board panels has to be repaired before applying new wallpaper or treating them in any other way. In order to avoid these disadvantages, the surface of the plaster board panels is improved after their manufacture by preforming an additional operation of applying a synthetic resin dispersion for example a polyvinyl acetate dispersion. However, this operation, requires the further expenditure of material and time.

It has now been found that plaster board panels do not have the above disadvantages wherein the top layer of at least one of the two cardboard sheets contains polyolefin fibrides.

The subject of the present invention is therefore plaster board panels consisting of a gypsum core with cardboard sheets attached on both sides, wherein at least the top layer of one of the two cardboard sheets contains from 90 to 10 weight % of cellulose containing fibres, and from 10 to 90 weight % of polyolefin fibrides, relative to dry matter.

Depending on the intended application of the plaster boards, it may be advantageous that the top layers of both cardboard sheets, the interlayers or even the entire sheets contain from 10 to 90, preferably 40 to 70, weight % of polyolefin fibrides.

The heat treatment at a temperature of about 250° C. required in the manufacture of the plaster boards provides after evaporation of the water, a surface temperature on the panels which is sufficient for plastifying the polyolefin fibrides and for bonding them with the other cardboard components. As a result, the pores in the top layer of the cardboard are substantially closed and the surface of the plaster board panel becomes resistant to wet treatment. The bond which closes the pores occurs only after the water is completely evaporated, since before this time, the temperature of the board does not 100° C. due to steam generation. The bonding and closing effect may be further increased by applying a hot gas shower having a gas temperature of from 130° to 300° C., preferably 140° to 200° C., after the heat treatment. Alternatively, the hot gas treatment may be carried out later and independently from the heat treatment during the manufacture. Instead of a hot gas shower, a smooth or stamped roller having a temperature above the softening point of the polyolefin fibrides may be used.

Generally, cardboard material having a weight of about 300 g/m$^2$ is used for the manufacture of plaster boards. Such cardboards are mostly manufactured in such a manner that they consist of several layers the last of which is the top layer having a weight of from 10 to 100 g/m$^2$, preferably 30 to 70 g/m$^2$.

According to this invention, such cardboards used for the plaster board panels have a complete mass or individual layers, preferably the top layer, consisting of a mixture of from 90 to 10 weight %, preferably from 60 to 30 weight %, of cellulose fibers, and of from 10 to 90 weight %, preferably 40 to 70 weight %, of polyolefin fibrides, relative to dry matter.

The polyolefin fibers to be used for this invention are preferably manufactured according to an evaporation process with pressure release, in the following manner:

A superheated emulsion being under pressure and containing (a) a solution of a polyolefin in a low-boiling solvent, and (b) an aqueous solution of a hydrophilizing agent is pressed through a nozzle into a zone of low pressure; the hydrophilizing agent being used in an amount of from 0.2 to 3 weight %, preferably 0.5 to 2 weight %, relative to the polyolefin.

A suitable polyolefin is above all polyethylene having a reduced specific viscosity of from 0.3 to 30 dl/g, preferably from 0.7 to 10 dl/g (determined according to H. Weslau, Kunststoffe 49 (1959), p. 230) and a density of from 0.93 to 0.97 g/cm$^3$, or also polypropylene. These polyolefins may contain small amounts of comonomers having from 3 to 6 carbon atoms.

Suitable hydrophilizing agents are in principle all known emulsifier types; however, polymer hydrophilizing agents containing amino, amido, carboxy and/or hydroxy groups are preferably used. Particularly good results are obtained when polyvinyl alcohol having a viscosity of from 4 to 70 cP (measured at 20° C. on a 4% solution in water) and a saponification degree of from 80 to 99.5% is employed.

The solvent for the polyolefin must have a sufficiently low boiling point in order to ensure satisfactory superheating and evaporation with pressure release; on the other hand, however, it must have a sufficiently high critical temperature. Suitable solvents for the process in accordance with this invention are therefore hydrocarbons having from 5 to 7 carbon atoms, preferably cyclic or acylic saturated hydrocarbons having 5 or 6 carbon atoms. Furthermore, chlorinated hydrocarbons having 1 to 2 carbon atoms, preferably methylene chloride, are very appropriate as well.

The temperature of the emulsion may vary within the limits of from 110° to 200° C.; temperatures of from 120° to 160° C. being preferred. The emulsion is under autogenous pressure of the water/solvent mixture, which pressure may be increased by means of an inert gas and/or a pump.

The emulsion consisting of a solution of the polyolefin and a solution of the hydrophilizing agent should be as homogeneous as possible. This can be achieved in batchwise or continuous operation when the emulsion is prepared in commercial emulsifying devices ensuring a good circulation of substances and a sufficient shearing action. The advantages of the process in accordance with this invention are manifest in water-in-oil emulsions and in oil-in-water emulsions as well.

For evaporation with pressure release, the emulsion passes through a nozzle the main task of which is to maintain a difference of pressure between the emulsion and the pressure release zone. The pressure in the latter on is adjusted in such a manner that the solvent for the polymer evaporates at a rate above 90%. Of course, part of the water evaporates simultaneously. The pressure should be generally from 10 to 1500 mm Hg, preferably from 50 to 800 mm Hg. The weakly hydrophilic polyolefin fibers obtained can be comminuted and dehydrated in commercial apparatus.

These polyolefin fibrides may be used in any amount for the manufacture of paper from cellulose containing material in usual machines. Paper or cardboard containing polyolefin fibrides do not behave differently from normal paper on processing. Fibride containing cardboard has a higher porosity than normal cardboard, and it is therefore especially suitable in accordance with this invention, because it ensures easy evaporation of water in the heat treatment of the plaster board panels.

At the end of the heat treatment after the water has evaporated, temperatures of from 130° to 200° C. occur on the surface of the plaster board panels, at which temperatures the polyolefin fibrides become plastified and bonded with themselves and the other components of the cardboard, so that a substantially sealed surface of low porosity is formed. Thus, the initially very absorbent, porous surface is then sealed and resistant to wet treatment and it is excellently suitable for painting or coating systems to be applied to it.

The use of plaster board panels in accordance with this invention for the interior of buildings as wall and ceiling elements is especially advantageous, because, at profitable material consumption rates, the panels meet the highest-quality requirements of surface shaping and decoration, event in the case of possibly necessary wet treatment.

The following examples illustrate the invention.

EXAMPLE 1

For the manufacture of plaster board panels for tests, a normal cardboard sheet is placed in an open rectangular mold the edges of which have a length of about 40 cm. Then an aqueous gypsum paste is added in such an amount that, after setting, a gypsum layer having a thickness of about 1 cm is formed. On top of the aqueous gypsum paste, another cardboard sheet having a weight of about 300 g/m$^2$ is placed. This cardboard sheet is composed of three layers, the top layer having a weight of 35 g/m$^2$ and containing polyethylene fibrides in an amount of 17 g/m$^2$, corresponding to 50 weight % relative to dry matter.

The polyolefin fibrides are manufactured as follows:

A vessel having a capacity of 250 liters, provided with an agitator and an outlet valve being connected via a duct to a nozzle leading into a pressure release recipient, is charged with 10 kg polyethylene (density 0.95 g/cm$^3$, MFI 190/5: 22 g/10 min), 120 liters water, 150 g polyvinyl alcohol (viscosity 4.6 to 6 cP, measured at 20° C. on a 4% solution in water; saponification degree 98.5 to 100 mol %), and 120 liters hexane. Subsequently, the vessel is closed, the contents are heated to 150° C. with agitation and maintained at this temperature for about 2½ hours, thus establishing a pressure of 12.3 kg/cm$^2$. After the polyethylene has dissolved and the contents of the vessel have converted to an emulsion, the outlet valve is opened and the emulsion is discharged into the pressure release recipient to such an extent that a vacuum pump connected to this recipient is able to remove the vapors set free and to maintain a pressure of about 200 mm Hg. The fibers so obtained are pasted with water, passed 7 times through a disk refiner, and subsequently separated from the water by centrifugation. The fibers were bulked in an air current and dried, and they had a classified length of 0.9 mm according to TAPPI standard T 233 SU 64.

The top layer of cardboard containing the polyethylene fibrides faces away from the gypsum paste, and it forms the outer surface of the plaster board panel. The mold charged as described above is placed into a drying cabinet heated at 250° C. in order to set the gypsum and to evaporate the excess water. After evaporation of the water, the temperature at the surface of the plaster board panel rises to 133° C. for a short time. After about 30 minutes, the panel can be taken from the mold (panel 1). In order to evaluate the porosity, the water absorption of the fibride containing top layer of the cardboard is determined. Before the heat treatment, 187 cm$^3$ of water are absorbed by 100 g of the fibride containing top layer. After the heat treatment, the water absorption amounts to 96 cm$^3$ per 100 g of fibride containing top layer. The pore diameter has decreased from 15 to 10 microns.

EXAMPLE 2

A plaster board panel manufactured according to Example 1 is subjected after the normal heat treatment for 1 second to a hot air shower having a gas temperature of 250° C. The temperature on the surface of the panel is about 150° C. (panel 2). The porosity is determined as described in Example 1. The water absorption of the fibride containing top layer has decreased after the heat treatment and the hot air shower from an initial 187 cm$^3$ water per 100 g top layer to 48 cm$^3$ water per 100 g top layer. The pore diameter has also decreased from initially 15 to about 5 microns.

EXAMPLE 3

Plaster board panels manufactured in accordance with this invention as decribed in Examples 1 and 2 are treated with a commercial air-drying alkyd resin/oil lacquer. One coat is sufficient to obtain a coherent film. As compared to normal plaster board panels of identical dimensions, the amount of material saved is about 15% in the case of panel 1 and about 20% in the case of panel 2.

EXAMPLE 4

Plaster board panels manufactured according to this invention as described in Examples 1 and 2 are treated with a commercial polyvinyl acetate dispersion. One coat is sufficient to obtain a coherent film. As compared to normal plaster board panels of identical dimensions, the amount of material saved is about 20% in the case of panel 1 and about 25 to 30% in the case of panel 2.

EXAMPLE 5

Plaster board panels manufactured according to Examples 1 and 2 are wallpapered in known manner by means of a commercial aqueous glue and a normal wallpaper on the basis of cellulose paper. In order to remove the wallpaper, it is soaked with water and torn off. The surface of both panels manufactured according to this invention is undamaged; no water has penetrated into the cardboard, and the surface is ready for another treatment without having to be repaired.

What is claimed is:

1. A plaster board panel consisting essentially of a gypsum core having two sides, faced by a cardboard sheet on each side of the gypsum core, each sheet having a plurality of cardboard sheet layers, and one of said layers being the outermost layer, wherein at least the outermost cardboard sheet layer on one of the two sides contains 90 to 10% by weight of cellulose containing fibers, and from 10 to 90% by weight of polyolefin fibrides, relative to dry matter.

2. The plaster board panel, as claimed in claim 1, wherein the outermost cardboard sheet layer of each of the two sides contains 90 to 10% by weight of cellulose containing fibrides, and from 10 to 90% by weight of polyolefin fibrides, relative to dry matter.

3. The plaster board panel, as claimed in claim 1, wherein the cardboard sheet layers contain 90 to 10% by weight of cellulose containing fibers, and from 10 to 90% by weight of polyolefin fibrides, relative to dry matter.

4. The plaster board panel, as claimed in claim 1, 2 or 3, wherein the cellulose containing fibers are contained in amounts of 60 to 30% by weight and the polyolefin fibrides are contained in amounts of 40 to 70% by weight.

5. The plaster board panel, as claimed in claims 1, 2 or 3, wherein the polyolefin is polypropylene.

6. The plaster board panel, as claimed in claims 1, 2 or 3, wherein the polyolefin is polyethylene.

7. The plaster board panel, as claimed in claim 6, wherein the polyethylene has a viscosity of from 0.3 to 30 dl/g and a density of 0.93 to 0.97 g/cm$^3$.

8. The plaster board panel, as claimed in claim 7, wherein the polyethylene has a viscosity of from 0.7 to 10 dl/g.

9. The panel, as claimed in claims 1, 2 or 3, wherein said each of said cardboard sheets have a weight of about 300 g/m$^2$ and the outermost cardboard sheet layer has a weight of 10 to 100 g/m$^2$.

10. The panel, as claimed in claim 9, wherein the outermost cardboard sheet layer has a weight of 30 to 70 g/m$^2$.

11. The panel as claimed in claims 1, 2 or 3, wherein the layer containing the polyolefin fibrides is applied to the plastic board panel simultaneously with the remaining cardboard sheet layers.

12. A process for the manufacture of a plaster board panel consisting essentially of a gypsum core having two sides and a cardboard sheet bonded to each of the two sides of the gypsum core, the cardboard sheet including a plurality of cardboard sheet layers, comprising the steps of introducing a gypsum paste between two cellulose containing cardboard sheets to form a panel, the outermost layer of at least one of the cardboard sheets containing from 90% to 10% by weight cellulose containing fibers and from 10 to 90% by weight polyolefin fibrides, relative to dry matter, and subjecting the panels to a heat treatment for a period of time and at a temperature sufficient to plastify the polyolefin fibrides.

13. The process as claimed in claim 12, comprising the steps of first, introducing a gypsum paste having a water content between two cardboard sheets containing cellulose to form a panel, the top layer of at least one of the cardboard layers consisting of 90 to 10% by weight cellulose containing fibers and from 10 to 90% by weight polyolefin fibrides, relative to dry matter;

second, subjecting the panel to a heat treatment for a period of time and at a temperature sufficient to evaporate the water;

third, continuing the heat treatment for a period of time and at a temperature sufficient to plastify the polyolefin fibrides.

14. The process as claimed in claim 13, comprising the further step:

fourth, applying a hot gas shower to the panel to further plastify the polyolefin fibrides.

15. The process as claimed in claim 12 or 13, wherein the polyolefin is polyethylene.

16. The process as claimed in claim 12 or 13, wherein the polyolefin is polypropylene.

17. The process as claimed in claim 13, comprising the further step of fourth, rolling a heated roller having a temperature above the softening point of the polyolefin fibrides, over the cardboard layer containing the polyolefin fibrides.

18. The process, as claimed in claims 12 or 13, wherein the cellulose fibers are contained in amounts of 60 to 30% by weight and the polyolefin fibrides are contained in amounts of 40 to 70% by weight.

19. The process, as claimed in claims 12 or 13, wherein during heat treatment the outermost layer containing the polyolefin fibrides has a temperature of from 130° to 200° C.

20. The process, as claimed in claim 13, wherein in said second and third steps, said heat treatment comprises placing the panel into a drying cabinet.

21. The process, as claimed in claim 12 or 13, wherein the temperature of the heat treatment is about 250° C.

22. The process as claimed in claim 14, wherein said hot gas shower has a gas temperature of 130° to 300° C.

23. The process, as claimed in claim 22, wherein said gas shower has a gas temperature of 140° to 200° C.

* * * * *